United States Patent [19]

Engelhard et al.

[11] 3,832,602

[45] Aug. 27, 1974

[54] PRINT FOR CONTROL MODULES OF CONTACT-FREE CONTROL AND REGULATING SYSTEMS

[75] Inventors: Dieter Engelhard, Grossgrundlach; Hermann Hofmann, Erlangen; Ulrich Schaff, Erlangen; Walter Kaiser, Erlangen, all of Germany

[73] Assignee: Siemens Aktiengesellschaft, Berlin & Munich, Germany

[22] Filed: Aug. 28, 1972

[21] Appl. No.: 284,449

Related U.S. Application Data

[63] Continuation of Ser. No. 100,574, Dec. 22, 1970.

[30] Foreign Application Priority Data

Dec. 31, 1969 Germany............................ 1965683

[52] U.S. Cl.............................................. 317/101 R
[51] Int. Cl.............................................. H05k 5/00
[58] Field of Search..... 317/101 R, 101 C, 101 CM, 317/101 DH; 330/68; 325/357; 334/15

[56] References Cited

UNITED STATES PATENTS

| | | | |
|---|---|---|---|
| 2,718,623 | 9/1955 | Yoder et al. | 317/101 R |
| 2,896,028 | 7/1959 | Mackey | 317/101 R |
| 3,100,282 | 8/1963 | Fletcher | 330/68 |
| 3,196,364 | 7/1965 | Latham, Jr. | 330/68 |
| 3,249,818 | 3/1966 | Hwang et al. | 317/101 CM |
| 3,300,686 | 1/1967 | Johnson et al. | 317/101 DH |
| 3,649,937 | 3/1972 | Carlson | 333/82 B |

*Primary Examiner*—David Smith, Jr.
*Attorney, Agent, or Firm*—Herbert L. Lerner

[57] ABSTRACT

A print for control modules of contact-free control and regulating systems comprising an insulating carrier plate having one portion of one surface adjacent the control inputs provided with a plurality of anti-interference filters. The number of filters is the same as the number of control inputs. The other portion of the one surface of the plate is provided with the same number of threshold value stages connected to the filters. The other surface of the carrier plate has a metal layer thereon which is electrically interrupted in accordance with the boundary between the first and second portions of the one surface thereof. The portion of the layer corresponding to the first portion is connected to ground and the portion of the layer corresponding to the second portion is connected to a reference potential.

8 Claims, 4 Drawing Figures

PRINT FOR CONTROL MODULES OF CONTACT-FREE CONTROL AND REGULATING SYSTEMS

This is a continuation, of application Ser. No. 100,574, filed Dec. 22, 1970.

DESCRIPTION OF THE INVENTION

The invention relates to a print for control modules of contact-free control and regulating systems. More particularly, the invention relates to a print for control modules for the input circuits of electronic systems located in complete circuits or in cabinets.

The print comprises an insulating carrier plate having conductive paths and components or complete modules. Prints of this type are known and are usually occupied on one surface by modules and components. The connecting conductors which interconnect the modules or components are located on the back of the plate in the form of printed conductor paths. The module connections extend to the back surface of the plate via holes through said plate and are soldered to the conductor paths on the back surface.

It is also known to provide the conductor paths on the back surface, as well as on the front surface, of the insulating carrier plate. If necessary, the plate may also be provided with components on both sides. Furthermore, pressure contacts from one conductor path on one surface of the plate to a conductor path on the other surface of the plate are customary.

In order to remove interferences from the input prints, which are adjacent each other, similarly to all carriers which are equipped with semiconductor components, in inserts or structural frames of control cabinets, it is also known to provide the insulating plate on the front surface with the components or modules and with the corresponding conductor paths and to provide the rear surface of said plate with a continuous or uninterrupted metal base layer. This feature permits the terminals of the components or modules on the front surface, which must be connected to a reference potential or ground potential, to be connected directly to the metal layer, thereby providing the shortest connection to the reference or ground potential.

The object of the invention is to provide input carrier plates which are generally connected to circuits which issue from remotely positioned electronic or mechanical signal transmitters such as, for example, machine tools. Such prints, for command-processing input control modules, are particularly vulneratie to interferences. This is due to the fact that interference voltages and interference couplings may produce false signals in the control module prints. The false signals may cause error controls in the control equipment such as, for example, a machine tool control, connected at the output end. Not only are the indicated input control module prints vulnerable, but also the connecting leads from the signal transmitters to the input control modules. This is because the interfering signals may also be coupled into such leads, even when said leads are shielded. That is, when a plurality of input control leads are combined to form a cable, interferences occur even when the cable itself is shielded or screened. This is due to the possibility that signals from one control lead may be coupled primarily capacitively into the adjacent control lead and may thus result in errors in the machine control. To prevent such occurrences, it has previously been suggested to provide the input control module prints, to which the input cables are connected, with filter devices, and to provide one filter for each input control lead. The filters utilized are usually RC filters, LC filters, or RLC filters, in $\pi$ or T connection.

If, due to additional space requirements, filters and other input semiconductor control modules or components are also to be provided on the carrier plate, interference couplings may occur from the filters to the control modules connected to the output end, so that faulty controls may again occur.

To further protect the input control module prints from interferences, in accordance with the invention, one surface of the carrier plate may be provided on one portion adjacent the control inputs with a number of anti-interference filters or modules, corresponding in number to the number of control inputs. The other portion of the one surface of the carrier plate is provided with a corresponding number of threshold stages connected to the outputs of the filters. The other surface of the carrier plate is provided with a metal layer which is electrically interrupted in accordance with the portions of the one surface of the carrier plate. The portion of the metal layer corresponding to the one portion is connected to ground and the portion of the metal layer corresponding to the other portion is connected to a reference potential of the current supply.

In accordance with another feature of the invention, the gap in the metal layer may be bridged at a predetermined locality by electronically responsive coupling means such as galvanic means, inductive means and/or capacitive means.

In accordance with another feature of the invention, the ground and the reference potential of the current supply may be electrically interconnected at one point, which point may be a reference point or a reference bus.

The protective measure of the apparatus of the invention may be utilized not only for input control module prints, but also for output control module prints. This is done when care must be taken to insure that the relays or power semiconductors at the control end, which are high current loads, or which switch high currents, will couple the induction voltages to the electronic control connected at the input.

For the futher dampening of possibly occurring interfering voltages, base load resistors may be connected in the inputs of the filters, in order to provide adequate contact current. The threshold value stages, which are connected in the outputs of the filters, may then be constructed, in accordance with conventional circuit technology, of separate components, but preferably comprise integrated compact components. The threshold value stages function to steepen the signal flanks or edges which may be flattened by the filters. They also function to suppress the possible contact bounce or chatter of electromechanical transmitters. When an additional supply voltage is utilized, they assist in obtaining an adequately high statistical signal threshold. This type of higher signal threshold is beneficial, since, due to transit time effects and inductive voltage drops in the lead, line or circuit between the reference point and the input control module print, the reference potential in the input control module print need not be identical with the reference potential of the reference point or reference bus. To prevent affecting the reference potential of the entire control, the reference potential of the filter portion in the control module print is applied to the reference bus via the cable shield of the input leads.

The reference potential of the threshold value stages connected to the outputs of the filters is identical with the reference potential of the entire control. This protects the reference potential of the entire control from outside influences. Furthermore, the interference currents then flow directly from the interference-afflicted signal cable to the reference bus, via the filter. Also, when a conventional structure with separate components is selected, the threshold value stage may be slowed down, so that additional interference protection is available by utilizing the dynamic interference immunity. If the conventional separate components are exclusively replaced by integrated modules, a higher signal threshold at the input module must be relinquished, due to the elimination of an additional supply voltage. Furthermore, no possibility exists, as a rule, to utilize the dynamic interference immunity of flatter switching flanks or edges. Thus, in order to obtain adequate interference immunity, despite this fact, an optimum of such immunity must be provided by a sensible arrangement of conductor paths, and particularly, by the structure of the metal layer on the rear surface of the carrier plate.

The metal layer or base coating is not continuously or uninterruptedly applied to the rear surface of the input control module print, but is subdivided with a gap. The gap separates the two portions of the base coating or metal layer. One half of the print then contains the filter portion, whereby the capacitive coupling of the incoming input leads, including the filter portion having half the base coating, prevents an over-coupling onto the other print portion, containing the integrated threshold stages. Simultaneously, a good capacitive coupling is provided between the conductor paths of the other print portion and the other portion of the base coating which is connected to the reference potential of the current supply.

Experimental investigations have indicated that at a voltage peak of approximately 3 kilovolts, no interference or disturbance is released between the reference potential of the current supply and the input leads, even if sparkovers have already occurred from conductor path to conductor path. The limit of the immunity from interference is thus determined by the dielectric strength of the mechanical structure.

In order that the invention may be readily carried into effect, it will now be described with reference to the accompanying drawings, wherein.

In the FIGS., the same components are identified by the same reference numerals.

Figure 1:
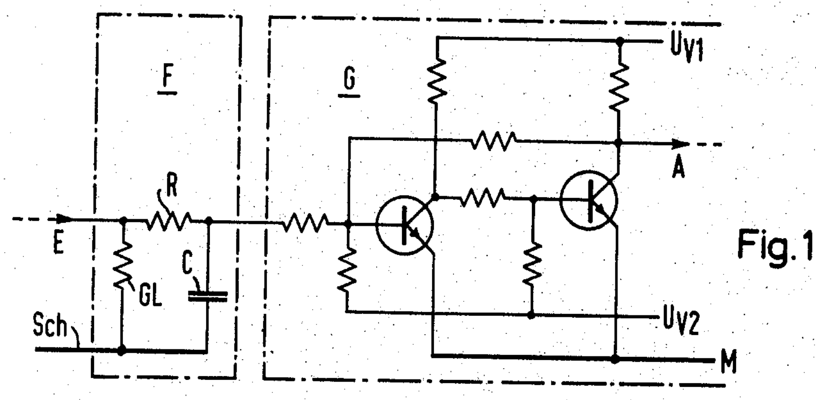
FIG. 1 is a circuit diagram of an embodiment of the front surface of the print of the invention.

FIG. 1 illustrates an input control module print of the invention. Half the front surface of the carrier plate of the print is the filter portion F and the other half is the threshold value stage G. Each of the threshold value stages G is connected between the output of a corresponding one of the filters F and an output of the print. The threshold value stage G comprises separate components. The current supply provides a reference potential M. A lead Sch is connected to the cabinet ground or the reference bus. A base load resistor GL is provided.

Figure 2:
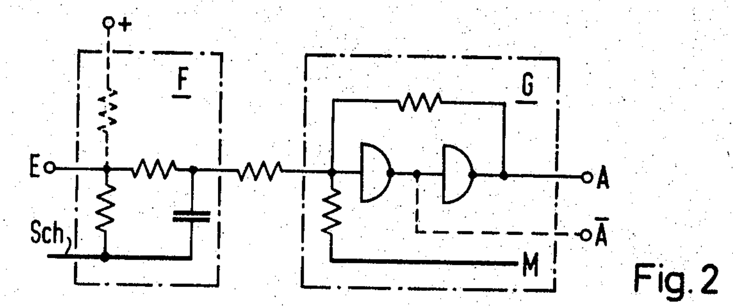
FIG. 2 is a circuit diagram of another embodiment of the front surface of the print of the invention.

FIG. 2 illustrates a structural arrangement wherein threshold value stages or threshold magnitude indicators are utilized in accordance with integrated circuits technology. A carrier plate is provided with a plurality of filters F and a plurality of threshold value stages G. The number of filters F and the number of threshold value stages G corresponds to the number of inputs or input leads E.

Figure 3:
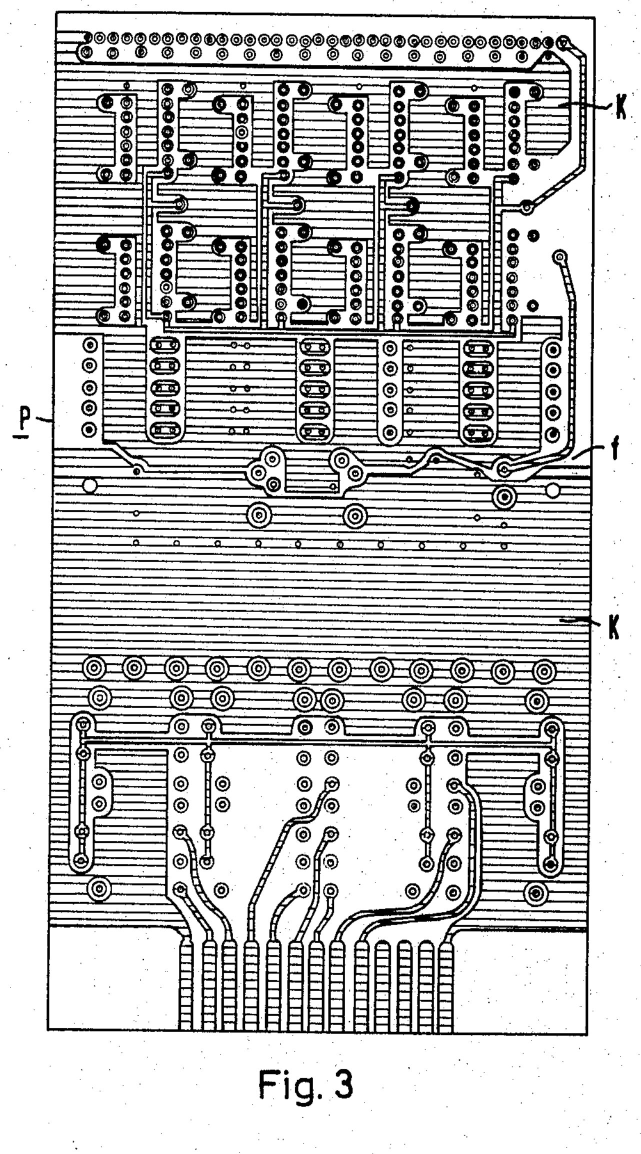
FIG. 3 is a schematic diagram of an embodiment of the rear surface of the print of the invention.

FIG. 3 illustrates the back surface of the input carrier plate P of the print of the invention. The back surface of the carrier plate P has a metal layer or base coating K thereon. The metal layer is electrically interrupted at approximately the middle thereof by a gap f. The lower half of the plate P has the filters F on its front surface and the upper half of said plate hat the threshold value stages G on its front surface. The gap f may be electrically bridged at a predetermined area.

Figure 4:
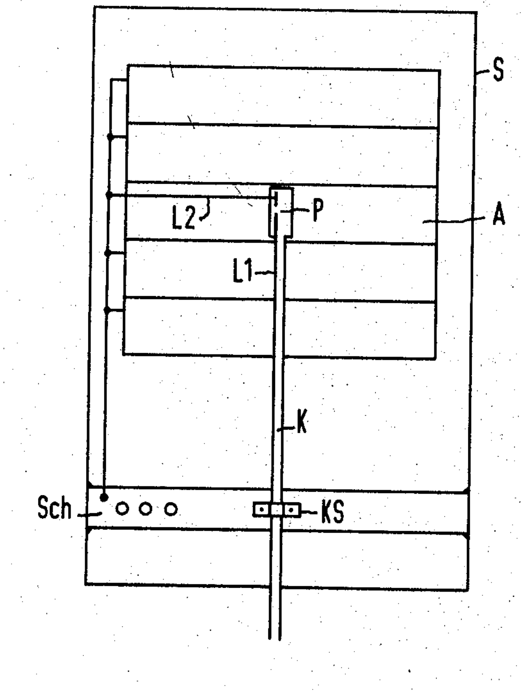
FIG. 4 is a schematic diagram of an embodiment of the print of the invention in a structural frame of a cabinet.

FIG. 4 illustrates the arrangement of an input module carrier plate P in a construction frame AA of a cabinet S. One half of the base coating or metal layer is connected via a cable shield L1 to the ground of the cabint S, for example, the reference bus Sch. The other half of the base coating or metal layer is connected via a reference potential L2 of the current supply to the ground of the cabinet S. A plurality of leads L1 may be combined to form a cable KK. The cable shield L1 is connected to the reference bus Sch via a clamp KS.

While the invention has been described by means of a specific example and in a specific embodiment, we do not wish to be limited thereto, for obvious modifications will occur to those skilled in the art without departing from the spirit and scope of the invention.

We claim:

1. A print for control modules of contact-free control and regulating systems particularly for the input circuits of electronic systems located in complete circuits or in cabinets, said print being connectable between a plurality of control inputs and a plurality of outputs, and being connectable to a source of reference potential of a current supply, said print comprising an insulating plate having conductive paths and components or complete modules, said plate having one surface having one portion adjacent the control inputs having a plurality of control units having anti-interference modules on said surface, another surface, a metal anti-interference layer on the other surface, and a continuous non-conductive gap electrically interrupting the metal layer thereby dividing the metal layer into two metal layers, said metal layers being connected to different potentials of the current supply.

2. A print as claimed in claim 1, wherein the metal layer is electrically interrupted by a gap which is bridged at a predetermined locality by electrically responsive coupling means.

3. A print as claimed in claim 2, wherein ground and the reference potential are electrically interconnected at one point.

4. A print as claimed in claim 2, wherein the coupling comprises galvanic means.

5. A print as claimed in claim 2, wherein the coupling comprises inductive means.

6. A print as claimed in claim 2, wherein the coupling comprises capacitive means.

7. A print as claimed in claim 3, wherein the point of interconnection is a reference point.

8. A print for control modules of contact-free control and regulating systems particularly for the input circuits of electronic systems located in complete circuits or in cabinets, said print being connectable between a plurality of control inputs and a plurality of outputs, and being connectable to a source of reference potential of a current supply, said print comprising an insulating plate having conductive paths and components or complete modules, said plate having one surface having a first portion adjacent to the control inputs having a plurality of anti-interference modules connected to said control inputs and having a second portion adjacent to the outputs having a plurality of threshold value stages corresponding in number to the number of anti-interference modules and connected to said anti-interference modules, said plate having another surface provided with a metal layer, said metal layer being divided into first and second separate regions interrupted electrically by a gap, said first and second regions being disposed under said first and second portions respectively, said first and second regions of the metal layer being electrically connected to different ground potentials of the current supply.

* * * * *